United States Patent Office 2,785,774
Patented Mar. 19, 1957

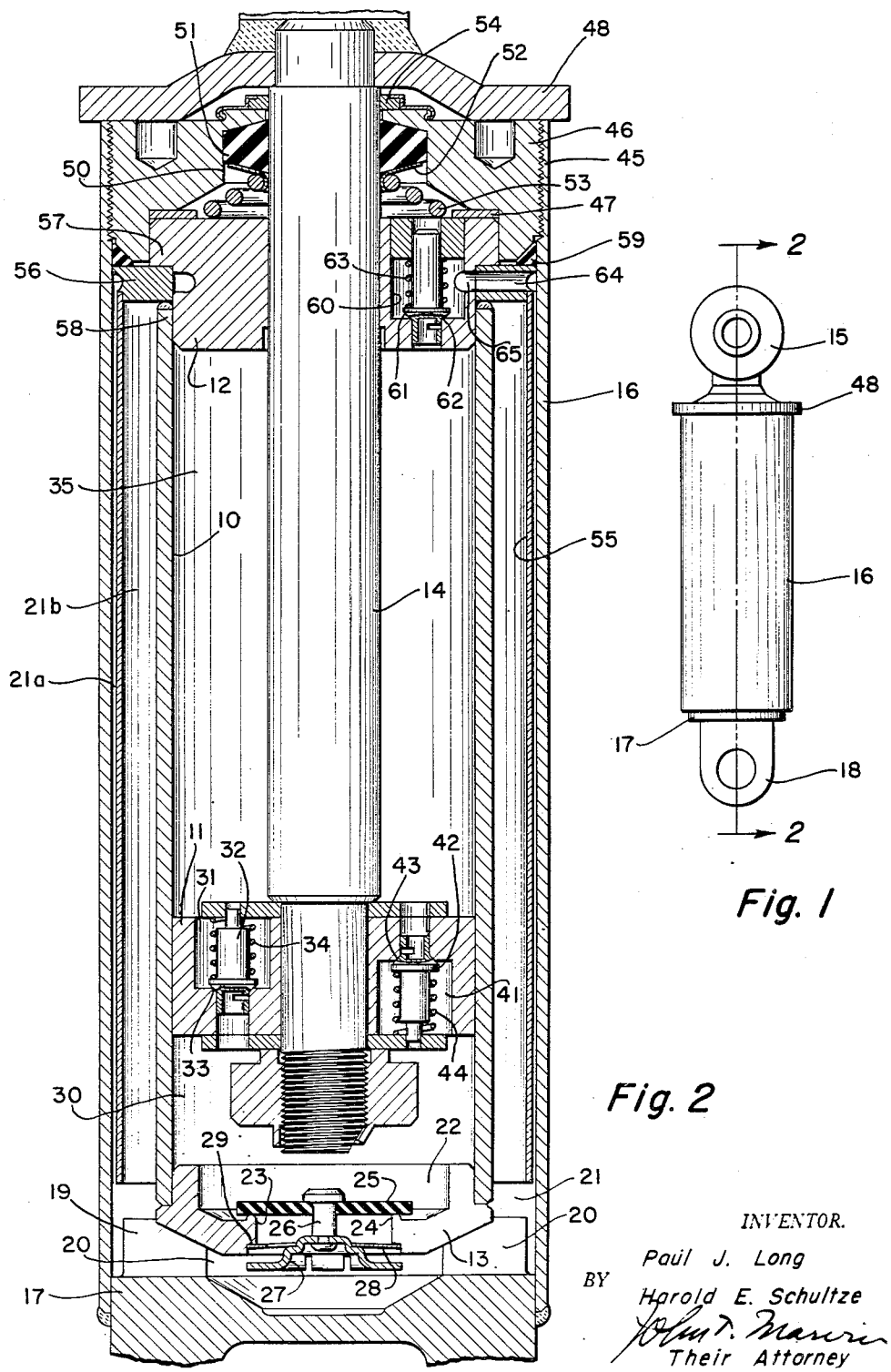

2,785,774

SHOCK ABSORBER WITH LIQUID COOLING

Paul J. Long and Harold E. Schultze, Dayton, Ohio, assignors to General Motors Corporation, Detroit, Mich., a corporation of Delaware Application August 14, 1953, Serial No. 374,349

2 Claims. (Cl. 188—88)

This invention relates to hydraulic shock absorbers, and particularly to direct acting type shock absorbers. In many heavy duty applications of shock absorbers on vehicles, the volume of liquid transferred between opposite ends of a hydraulic shock absorber is quite large and results in development of high temperature conditions in the hydraulic liquid and in the metal parts comprising the shock absorber which thereby stores the heat developed. This renders the heating of the shock absorber and the oil therein cumulative, gradually increasing the heating difficulty. The heating condition is also aggravated by requirements of placing a hydraulic shock absorber in places of little air circulation.

In the normal shock absorber, the displacement of liquid occurring between opposite ends of the cylinder creates a situation wherein substantially the same liquid is continuously being transferred between opposite ends of the cylinder, thus rapidly heating the liquid. The piston of the shock absorber normally has a rod extending through one end of the structure, a seal being provided around the rod to prevent the loss of hydraulic fluid. The liquid in the seal end or rod end of the hydraulic shock absorber is especially stagnant in that it is substantially trapped in the seal end of the shock absorber cylinder. Thus the liquid does not have an opportunity to cool off when the shock absorber is under heavy duty operating conditions.

The heat developed at the seal or rod end of the shock absorber reduces the life of the seal, the gasket, the spring, the shock absorber fluid and other components of the shock absorber.

It is therefore an object of this invention to eliminate the difficulties created by unduly high temperatures developed in a shock absorber resulting from heavy duty operations by providing for circulation of the hydraulic fluid from the operating cylinder through a cooling system that may comprise the reservoir for the shock absorber.

It is another object of the invention to provide a hydraulic shock absorber in accordance with the foregoing object wherein hydraulic fluid within the operating cylinder is discharged from the cylinder at the rod or seal end thereof and is then circulated through a cooling system for return through the operating cylinder at the opposite end thereof.

It is another object of the invention to provide a hydraulic shock absorber incorporating the features of the foregoing objects wherein the hydraulic fluid is circulated uni-directionally from the operating cylinder, through a cooling system, and thence returning the same to the operating cylinder.

It is another object of the invention to provide a hydraulic shock absorber wherein a piston reciprocates within a cylinder and is provided with suitable valving for effecting the desired shock absorber, the piston having a rod that extends through one end of the operating cylinder, the shock absorber also including valving provided in opposite ends of the working cylinder to provide for expelling of hydraulic fluid from the rod end of the shock absorber when the rod enters the working cylinder, and to provide for re-entry of fluid into the opposite end of the shock absorber when the rod retracts from the cylinder, the fluid so expelled and returned being circulated through a cooling system in the interim period from the time of its discharge to the time of its return.

Further objects and advantages of the present invention will be apparent from the following description, reference being had to the accompanying drawings wherein a preferred form of the invention is clearly shown.

In the drawings:

Figure 1 is an elevational view of a direct acting shock absorber of the type incorporating features of this invention.

Figure 2 is a transverse cross sectional view taken along line 2—2 of Figure 1 and illustrating in detail a shock absorber incorporating the features of this invention.

In this invention a shock absorber comprises a working cylinder 10 having a piston 11 reciprocal therein. The cylinder 10 has a closure member 12 at one end thereof and a closure member 13 at the opposite end, the closure members 12 and 13 being suitably bonded to the cylinder 10.

The piston 11 has an actuating rod 14 that carries the piston 11 on one end thereof. The actuating rod 14 extends through the closure member 12 at one end of the cylinder 10 and is provided with an eye 15 adapted for attachment to one of the relatively movable parts to which the shock absorber is to be attached.

The cylinder 10 is enclosed by a second cylinder or receptacle 16 positioned coaxial with the cylinder 10. The receptacle or cylinder 16 is in spaced relationship to the cylinder 10 and has one end thereof closed by a fitting 17, the fitting being suitably bonded to the cylinder 16. The fitting 17 has an eye 18 adapted for attachment to the other of the relatively movable members between which the shock absorber is adapted to be positioned.

The fitting 17 has a plurality of radially disposed projections 19 upon which the end closure member 13 seats to position this end of the cylinder 10 relative to the fitting 17 and the cylinder 16 and also provide passages 20 between the underside of the end closure member 13 and the fluid reservoir space 21 provided between the cylinder 10 and the cylinder 16.

The end closure member 13 has a recessed chamber 22 that has a central opening 23 therein through which fluid can flow between the interior of the cylinder 10 and the reservoir space 21. A valve seat 24 is provided around the edge of the opening 23, a valve 25 being adapted to seat upon the valve seat 24.

The valve 25 carries a central pin 26 that has a retaining member 27 on the end thereof provided with a plurality of radial fingers. A disk type spring 28 having a plurality of flexible radial fingers is placed between the retaining member 27 and a spring seat 29 whereby to retain the valve 25 upon the valve seat 24. Thus, the valve 25 allows flow of hydraulic fluid only from the reservoir space 21 into the chamber end 30 of the cylinder 10 that is located between the piston 11 and the end closure member 13.

The piston 11 has the valved passage 31 that receives the valve 32, the valve 32 is urged upon its valve seat 33 by a spring 34. Thus, the valve 32 provides for controlled flow of fluid from the chamber end 35 of the cylinder 10, between the piston 11 and the end closure member 12 and the chamber end 30 with the flow being from the chamber 30 into the chamber 35.

A second valved passage 41 is provided in the piston 11, this passage 41 having a valve 42 therein retained on its valve seat 43 by a spring 44. The valve 42 thus controls flow of hydraulic fluid from the chamber 35 into the chamber 30.

Thus, the valves 32 and 42 provide for controlled transfer of fluid from one side of the piston to the other thereof as the piston is reciprocated in the cylinder 10, the valves 32 and 42 regulating the flow for shock absorption purposes.

The receptacle cylinder 16 has the threaded end 45 that threadedly receives a retaining cap 46. The retaining cap 46 engages a washer 47 that rests upon the end closure member 12 to thus retain the cylinder 10 together with the end closure members 12 and 13 within the receptacle cylinder 16.

The actuating rod 14 carried by the piston 11 has a stop member 48 thereon adapted to engage the retaining cap 46 to limit the stroke of the piston 11 within the cylinder 10.

The retaining cap 46 has an axial recess 50 that receives a resilient rubber-like seal member 51 that frictionally engages the actuating rod 14 and seats within the recess 50. The seal member 51 is held under compression by a spring retainer 52 and a spring 53 positioned between the seal 51 and the end closure member 12.

A dirt shield 54 is carried on the outer end of the retaining cap 46.

A sleeve 55 is positioned within the cylinder 16 and is in spaced relationship to the cylinder 16 as well as to the cylinder 10, thus dividing the reservoir space into the chambers 21a and 21b. One end of the sleeve 55 has an annular ring 56 secured thereto, the ring 56 being held between an enlarged annular portion 57 of the end closure member 12 and the end 58 of the cylinder 10. A resilient rubber-like seal member 59 is placed between the annular ring 56 and the retaining cap 46 to prevent loss of fluid between the retaining cap 46 and the threaded end 45 of the sleeve 55.

The end closure member 12 has a valved passage 60 in which there is positioned a valve 61 retained on the valve seat 62 by a spring 63. The valved passage 60 communicates with a passage 64 in the annular ring 56 through an opening 65 provided in the side wall of the valved passage 60. Thus, hydraulic fluid can flow from the chamber 35 in the cylinder 10 through the valved passage 60, the openings 65 and 64 into the reservoir chamber 21a between the sleeve 55 and the cylinder 16 under control of the action of the valve member 61. Fluid thus passing through the reservoir chamber 21a will thermally contact the cylinder 16, and thus be cooled, before entering the reservoir chamber 21 for storage in the chamber 21b.

Under operating conditions, when the piston 11 moves toward the end closure member 13 of the cylinder 10 hydraulic fluid within the chamber 30 will be transferred from the chamber 30 into the chamber 35 under the controlled action of the valve 32 in the valved passage 31. At this time the base valve 25 is closed. The fluid that enters the chamber 35 from the chamber 30 of the cylinder 10 is greater in volume than can be received by the chamber 35 by an amount equivalent to the volume occupied by the actuating rod 14. Thus, the excess fluid being delivered into the chamber 35 will, at a predetermined pressure, open the valve 61 to provide for discharge of fluid from the chamber 35 through the valved passage 60, the openings 65 and 64 into the reservoir chamber 21a.

Upon movement of the piston 11 toward the end closure member 12 of the cylinder 10, hydraulic fluid will be transferred from the chamber 35 into the chamber 30 through the valved passage 41 under control of the valve 42. Valve 42 in the valved passage 41 is set to open at a lesser pressure than the valve 61 in the valved passage 60. Thus, all flow of hydraulic fluid from the chamber 35 to the chamber 30 will occur through the valve 42 when the piston 11 moves toward the end closure member 12.

Since the volume of hydraulic fluid delivered from the chamber 35 to the chamber 30 is less than the volume of fluid capable of being received by the chamber 30 by an amount equivalent to the volume occupied by the actuating rod 14, the base valve 25 will open against the action of the spring 28 to allow hydraulic fluid to pass from the reservoir chamber 21 through the passages 20 and through the valve 25 into the chamber 30.

From the foregoing description it will thus be seen that hydraulic fluid is uni-directionally circulated from the chamber 35 between the piston 11 and the end closure member 12 through the valved passage 60, and thence through the reservoir chamber 21a for return to the chamber 30 whenever the base valve 25 opens. Thus, the hydraulic fluid in the chamber 35 will never become stagnant but will constantly be replaced by fluid from the chamber 30 each time the piston moves through a reciprocal stroke of operation. The uni-directional flow of hydraulic fluid thus establishes a circulation of hydraulic fluid through the operating chambers 30 and 35 of the working cylinder 10 that continuously removes oil that has been heated by the heat dissipated into the oil resulting from the transfer through the control valves in the piston 11. While the hydraulic fluid is cooled by flowing through the narrow space 21a between the sleeve 55 and the cylinder 16 sufficiently to reduce the operating temperature of the oil to a safe level yet it will be understood that a completely extraneous circuit could be provided through which the oil could be circulated to provide for any desired degree of cooling of the oil.

Since the oil in the chamber 35 is constantly being replaced by oil from the chamber 30 that has been previously cooled, the temperature of the end closure member 12, the retaining cap 46 and the seal member 51 will be at a substantially lower level than in a shock absorber in which no circulation of the oil is provided. The lower temperature of operation of the seal thereby greatly increases the life of the seal 51, and extends the life of the shock absorber.

While the form of embodiment of the invention as herein disclosed constitutes a preferred form, it is to be understood that other forms might be adopted as may come within the scope of the claims which follow.

What is claimed is as follows:

1. A hydraulic shock absorber comprising in combination, a closed cylinder, a piston in said cylinder having valved passages providing for the controlled transfer of fluid from one side of the piston to the other as the piston is reciprocated in the cylinder, a receptacle around said cylinder forming therewith a fluid reservoir, a sleeve in said receptacle in spaced relation to said cylinder and to said receptacle and having one end in closed engagement with said receptacle and the opposite end thereof in open connection with said receptacle and said cylinder, means forming a passage between the closed end of said sleeve and the end of said cylinder thereadjacent and including valve means therein controlling flow of fluid from said cylinder into the space between said sleeve and said receptacle, the spaced relation of said sleeve relative to said cylinder and said receptacle being such that the annular space between said receptacle and said sleeve is substantially less in width than the annular space between said sleeve and said cylinder to provide a thin annular column for flow of fluid between said sleeve and said receptacle for cooling of the fluid, said sleeve extending from end to end of said cylinder for maximum contact of the thin column of fluid with the said receptacle for cooling of the fluid, and valve means in the opposite end of said cylinder providing for controlled flow of fluid from said receptacle into said cylinder.

2. A hydraulic shock absorber comprising in combination, a cylinder having closure walls at both its ends, a piston in said cylinder having valved passages providing for the controlled transfer of fluid from one side of the piston to the other as the piston is reciprocated in the cylinder, a receptacle around said cylinder forming therewith a fluid reservoir, a sleeve in said receptacle in spaced relation to said cylinder and to said receptacle and having an annulus portion at one end in engagement with one of said closure walls to close that end of said sleeve and support the same in said spaced relation and form thereby an outer chamber between said sleeve and said receptacle extending substantially the length of said cylinder and said outer chamber being sealed at the closed end of the sleeve from an inner chamber between said sleeve and said cylinder, the opposite end of said sleeve being in spaced relation to said receptacle and said cylinder and providing thereby open connection at the said opposite end of the sleeve between said chambers, means forming a passage at the said closed end of the sleeve between the end of said cylinder adjacent the said closed end of the sleeve and said outer chamber and including valve means therein controlling flow of fluid from said cylinder into said outer chamber, and valve means in the other closure wall of said cylinder providing for controlled flow of fluid from said reservoir into said cylinder.

References Cited in the file of this patent

UNITED STATES PATENTS

| | | |
|---|---|---|
| 2,048,285 | Padgett | July 21, 1936 |
| 2,107,974 | Bechereau et al. | Feb. 8, 1938 |
| 2,565,617 | Mercier et al. | Aug. 28, 1951 |
| 2,576,658 | Werner | Nov. 27, 1951 |
| 2,607,443 | Mayo et al. | Aug. 19, 1952 |

FOREIGN PATENTS

| | | |
|---|---|---|
| 567,589 | Germany | Jan. 5, 1933 |